Aug. 16, 1960

L. PIERCE ET AL 2,949,569

PERMANENT MAGNETS

Filed Aug. 26, 1957

INVENTORS
Lawrence Pierce &
Marshall P. White
BY
Frederick Shapoe
ATTORNEY 2,949,569

PERMANENT MAGNETS

Lawrence Pierce, Williamsville, N.Y., and Marshall P. White, Grand Haven, Mich., assignors to Westinghouse Electric Corporation, East Pittsburgh, Pa., a corporation of Pennsylvania Filed Aug. 26, 1957, Ser. No. 680,215

6 Claims. (Cl. 317—201)

This invention relates generally to permanent magnets and more particularly to permanent magnets of special shapes.

In the manufacture of permanent magnets heretofore it was not unusual to make them of C-shape or horseshoe shape. However, magnets of such special shapes usually had high leakage with the result that such magnets would tend to become saturated and the magnetomotive forces available for useful work was low.

The object of the invention is to provide a specially shaped permanent magnet with low leakage characteristics.

It is also an object of the invention to provide a permanent magnet of C-shape with a keeper that may be utilized for controlling the flow of flux in a metallic core.

Other objects of the invention will, in part, be obvious and will, in part, appear hereinafter.

The invention accordingly comprises the features of construction, combination of elements, and arrangement of parts, which will be exemplified in the construction hereinafter set forth and the scope of the application of which will be indicated in the claims.

For a fuller understanding of the nature and objects of the invention, reference should be had to the following detailed description taken in connection with the accompanying drawings in which.

Figure 6:
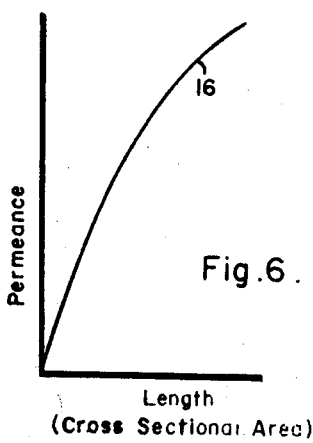
Figure 7:
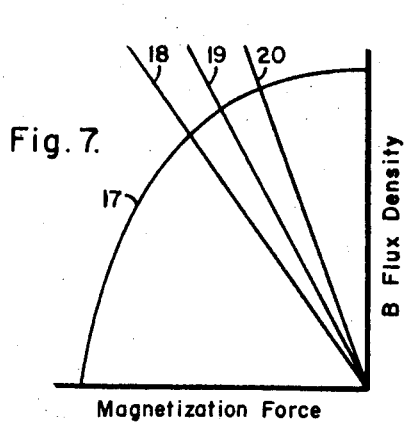

Fig. 6 is a diagram of a graph showing the permanence of the metallic permanent magnet portion of the magnet plotted on the ratio of length to cross-sectional area of the magnet; and Fig. 7 is a diagram of a graph illustrating flux density plotted on magnetizing force to illustrate that in making magnets after a predetermined length of magnet to cross-sectional area is reached there is very little further gain.

Figure 1:
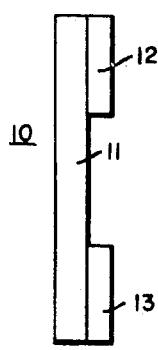
Figure 1 is a view in side elevation of a permanent magnet embodying the features of the invention.

Referring now to the drawings and Fig. 1 in particular, the magnet shown generally at 10 comprises three parts, the metallic permanent magnet 11 and the legs or pole pieces 12 and 13 made from ceramic permanent magnet material. The member 11 may be made in different shapes. However, the usual practice is to make it in bar form. The legs or pole pieces 12 and 13 will be made of large cross-sectional area but quite short in length.

There are a large number of metallic permanent magnet materials that may be utilized for manufacturing the metallic permanent magnet part 11. Good results have been obtained by using the permanent magnet materials, known as alnico, disclosed in Patents 2,245,477 and 2,295,082. These magnets are generally composed of aluminum, nickel, cobalt and iron with small additions of other elements added for certain specific purposes. Other permanent magnet materials well known in the art may also be employed. The methods of fabricating these permanent magnet alloys are well known and need not be described.

A number of ceramic permanent magnet materials are available in the art from which legs or pole pieces 12 and 13 can be made. The best known and one with which good results have been obtained is barium ferrite. The characteristic of this ceramic permanent magnet material is that its retentivity is high, and if demagnetized, it will regain substantially its original magnet characteristics. The permeability of the ceramic permanent magnet material is very close to unity. Therefore, it is like air and cannot be saturated. It has a high coercive force as shown by the demagnetization curve 14 of Fig. 5 and a low residual induction.

In order to obtain an appreciable amount of useful flux from magnets such as 12 and 13 made from ceramic permanent magnet material such as barium ferrite, the cross-sectional area of each magnet will be large relative to its length. This is due to the low flux density that it will carry. However, since the ceramic permanent magnet material has a high demagnetization value, the magnets, such as 12 and 13, are effective in short lengths. The coercive force will still be high even with a low length to area ratio. In making these magnets, the cross-sectional area may be made very large relative to the length.

Figure 5:
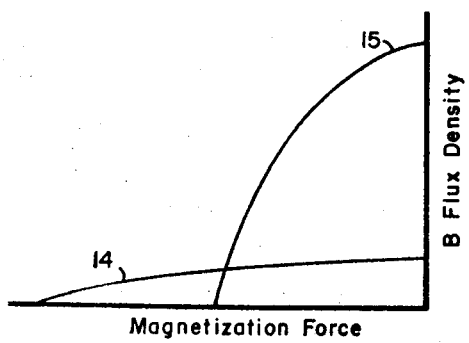
Fig. 5 is a diagram of a graph showing magnetic characteristics of the metallic permanent magnet material and the ceramic permanent magnet material utilized in making the magnet illustrated in Fig. 1.

In making the bar magnet 11, different rules must be observed. The length will be large relative to the cross-sectional area. A demagnetization curve 15 for a metallic permanent magnet material such as alnico comprising aluminum, nickel, cobalt and iron as shown in Fig. 5 is entirely different from the curve 14 for the ceramic permanent magnet material.

It has been found in making bar magnets, such as 11, that best results may be obtained from making the length and cross-sectional area in a predetermined ratio. However, there is an optimum ratio value, and this can readily be determined to meet the conditions under which the magnet is to be utilized. When working with high coercive forces of magnetic material, such as the alnico alloys comprising aluminum, nickel, cobalt and iron, the air gap line may be determined by the permeance coefficient (permeance is defined as flux density divided by the magnetizing force) of the magnet which for a straight bar magnet is the function of the magnet length divided by its cross-sectional area. Reference to the curve 16 of Fig. 6 will reveal the results that may be expected, namely, that toward the upper end of curve 16 the increase in permeance is small for a large increase in the length to area ratio. A comparison of the curve 16 with the curves 17, 18, 19 and 20 of Fig. 7 will show how little is to be gained after reaching a predetermined ratio between length and cross-sectional area. The intersection of line 18 and curve 17 corresponds to a point low on curve 16, and the intersections of lines 19 and 20 on curve 17 correspond to points higher on curve 16, thus showing progressively smaller gains in flux density with increasing ratios of length to cross sectional area.

Referring again to the magnet illustrated in Fig. 1, the pole pieces 12 and 13 are so applied that opposite poles of the members 11, 12 and 13 will be disposed in contact. The pole pieces 12 and 13 will be fastened to the bar magnet 11 in any well-known manner, such as by cementing or the like.

It is well known that when magnets are made with legs as in the well-known C-type or horseshoe magnet, that there is high leakage between the legs. This usually results in a certain saturation of the yoke portion of the magnet and the consequent lowering of the magnetomotive force that is available for delivering flux for a predetermined or required purpose.

In the magnet illustrated in Fig. 1, since the magnets or pole pieces 12 and 13 have characteristics somewhat similar to air, the leakage will be extremely low. Consequently, there will be no saturation of the member 11. If the saturation is low, the magnetomotive force for delivering flux to perform required functions is relatively high and substantially constant.

The composite magnet shown generally at 10 comprises a bar magnet of a metallic permanent magnet material, and pole pieces 12 and 13 of ceramic permanent magnet material which when arranged in such a special shape embody the desirable features of the two types of magnets. The bar magnet gives high retentive magnetomotive force because of the relationship of length to cross-sectional area. The ceramic permanent magnet material will have low flux density. Nevertheless, because of the high coercive force required to effect demagnetization, it is suitable for use in short lengths with large cross-sectional areas. Therefore, in the use of the ceramic permanent magnet material, a greater gain in magnetomotive force can be realized, while at the same time getting a very low leakage flux.

Figure 2:
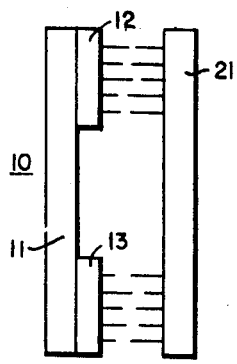
Fig. 2 is a view in side elevation of the permanent magnet illustrated in Fig. 1 shown equipped with a keeper.

Referring now to Fig. 2, a member of magnetic material or keeper 21 is provided for bridging the air gap between the pole pieces 12 and 13. When a keeper is applied in this manner all of the flux will flow through the pole pieces 12 and 13 and substantially no flux will flow from the opposite side of the bar magnet 11.

When ceramic permanent magnets are employed as shown in Fig. 2, they add to the magnetomotive force of the bar magnet 11. They cooperate in causing the magnetic flux to flow across the gap to the keeper 21. Further, the ceramic permanent magnets reduce leakage.

Figure 3:
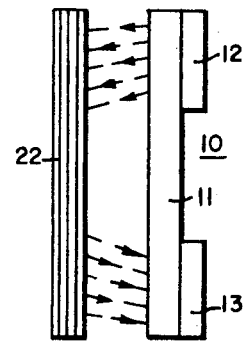
Fig. 3 is a view in side elevation of a permanent magnet, such as shown in Fig. 1, showing it utilized to saturate an iron core.

Sometimes in control apparatus and other equipment it may be desirable to employ a permanent magnet such as 10 for magnetizing an iron core 22 shown in Fig. 3. If the keeper 21 shown in Fig. 2 is removed from the pole pieces 12 and 13, then in view of the low leakage flux, a large amount of flux will flow out of the back of the bar magnet 11. This flux will enter the core 22 and saturate it, if the core and magnet have been proportioned to effect this function.

Figure 4:
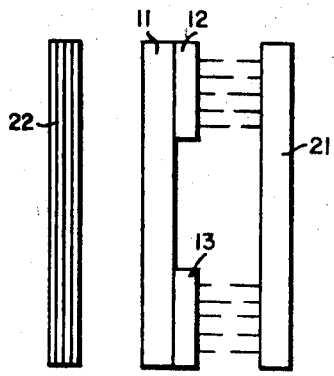
Fig. 4 is a view in side elevation of a permanent magnet of the type illustrated in Fig. 1 illustrating how the keeper may be utilized to prevent the permanent magnet from saturating the iron core.

Referring now to Fig. 4, which illustrates both a keeper 21 and a core 22, if for some reason it is desired to cut off the flow of flux from the core 22 to demagnetize it, then the keeper 21 will be applied to pole pieces 12 and 13. As soon as the keeper 21 is applied, all the flux will flow through the keeper saturating the bar 11, and substantially no flux will flow from the opposite side of the bar magnet 11 to the core 22.

Thus, by combining two permanent magnet materials, magnets of special shape may be made to perform useful functions such as controlling the flow of flux for a predetermined purpose. By proper design and proportioning, magnets may be constructed for performing functions that may be very useful and effective in control equipment and instruments.

Since certain changes may be made in the above construction and different embodiments of the invention may be made without departing from the scope thereof, it is intended that all matter contained in the above description or shown in the accompanying drawings shall be interpreted as illustrative and not in a limiting sense.

We claim as our invention:

1. In a magnet structure, in combination, a metallic permanent straight bar magnet having a pole at each end and having a predetermined length to cross-sectional area ratio, relatively short flat legs of ceramic permanent magnet material having a higher coercive force than the metallic bar magnet and of a permeability of close to unity and having poles at the flat faces, the ceramic magnet legs having a relatively large cross-sectional area, the flat ceramic magnet legs being applied in direct contact with each end of one side of the metallic permanent bar magnet, each flat ceramic magnet leg being so applied that its unlike pole is in direct contact with the pole at its respective end of the bar magnet thereby to simulate a magnet structure having short legs extending in the same direction.

2. In a magnet structure, in combination, a metallic permanent straight bar magnet having a pole at each end and having a predetermined length to cross-sectional area ratio, relatively short flat pole pieces of ceramic permanent magnetic material having a higher coercive force than the metallic magnet material and of a permeability of close to unity and having poles on the flat faces, the ceramic magnetic pole pieces having relatively large cross-sectional area, the flat pole pieces being applied to one side of the metallic permanent magnet substantially at the ends thereof, unlike poles of the ceramic magnets and of the bar magnet being in direct contact so that the metallic permanent magnet and the attached pole pieces simulate a permanent bar magnet with short laterally extending legs at each end on only the one side.

3. In a magnet structure, in combination, a metallic permanent substantially straight bar magnet having a pole at each end and having a predetermined length to cross-sectional area ratio, ceramic permanent magnets having a higher coercive force than the metallic magnet and of a permeability close to unity, said ceramic magnets being short in length and having a cross-sectional area large relative to the cross-sectional area of the metallic permanent magnet and being applied to one side of the metallic permanent bar magnet near its ends, the metallic permanent bar magnet and the ceramic permanent magnets having opposite poles in direct contact with one another, the combination of metallic permanent bar magnet and ceramic permanent magnets simulating a magnet with short laterally extending legs at each end on only the one side.

4. In a magnet structure, in combination, a metallic permanent substantially straight bar magnet having a pole at each end and of a predetermined length to cross-sectional area ratio, ceramic permanent magnets having a higher coercive force than the metallic magnet and of a permeability close to unity, said ceramic magnets being relatively short with respect to their cross-sectional area and having end faces conformable to the sides of the bar magnet, magnetic poles being present in the end faces, each of the ceramic magnets being applied to one side of the metallic permanent bar magnet near the opposite ends thereof in direct conforming fit thereto, opposite poles of the metallic permanent bar magnet and the ceramic permanent magnets being in contact with one another, the ceramic permanent magnets extending laterally with respect to the metallic bar magnet and presenting pole pieces on one side only thereof, and a magnetic keeper for bridging the pole pieces to control the flow of magnetic flux from the magnet, said keeper being disposed to be applied and removed from the pole pieces.

5. In a magnet structure, in combination, a metallic permanent substantially straight bar magnet having a pole at each end and of a predetermined length to cross-sectional area ratio, a plurality of ceramic permanent magnets having a higher coercive force than the metallic magnet and of a permeability close to unity, said ceramic magnets being short in length relative to their cross-sectional area and each having two pole faces, one ceramic permanent magnet being applied in direct contact with a pole face at each end on a given side of the metallic permanent bar magnet, opposite poles of the ceramic and metallic permanent magnet being placed in contact with one another to provide a bar magnet structure having two short laterally extending legs terminating in the other pole faces of the ceramic permanent magnets, and a magnetic keeper adapted for bridging the said other pole faces, the associated magnet structure and the keeper being capable of carrying substantially all of the flux of the magnetomotive force of the bar magnet to control the flow of flux.

6. In a magnet structure, in combination, a metallic permanent substantially straight alnico bar magnet having a pole at each end and of predetermined length to cross-sectional area ratio, two relatively flat ceramic permanent magnets short in length relative to their cross-sectional area and having poles at the flat faces thereof, the ceramic magnets being applied to the ends at the same side of the metallic permanent bar magnet, the flat ceramic magnets being so applied that the flat face having a pole opposite to that of the bar magnet is in contact with the bar magnet, the ceramic permanent magnets having substantially the same reluctance to the flow of magnetic flux as air to prevent leakage between the ceramic permanent magnets, the exposed flat face of each ceramic permanent magnet providing a pole piece and a magnetic keeper for bridging the pole pieces to control the flow of flux from the magnet.

References Cited in the file of this patent

UNITED STATES PATENTS 2,398,653    Linlor _____ Apr. 16, 1946

FOREIGN PATENTS 698,638    Great Britain _____ Oct. 21, 1953